Patented Feb. 17, 1953

2,628,974

UNITED STATES PATENT OFFICE 2,628,974

POLYESTER SYNTHETIC LUBRICANTS

Robert T. Sanderson, Fishkill, N. Y., assignor to The Texas Company, New York, N. Y., a corporation of Delaware No Drawing. Application March 27, 1948, Serial No. 17,585

8 Claims. (Cl. 260—485)

This invention relates to a method of preparing synthetic lubricants. More particularly, this invention relates to a method of preparing polyester synthetic lubricants whose properties may be tailor-made to predetermined specifications.

Various diesters formed by the reaction of a dibasic acid with a mono-hydroxy alcohol, or by the reaction of a di-hydroxy compound with a mono-carboxy acid have been employed as lubricating oils. An example of a diester which has attained some commercial use as a lubricant is di-2-ethylhexyl sebacate. Diesters of this type, although they may possess low pour points and flat viscosity-temperature properties, are handicapped by the fact that a wide viscosity range of materials of suitable properties cannot be made from readily available materials.

The reaction of glycols and dibasic acids to form polyesters is well-known. Polyesters resulting from this reaction are known as alkyd resins and have found widespread use as coating compositions, adhesive agents, etc. I have discovered that the reaction between a glycol and a dibasic acid can be utilized to prepare polyesters which have excellent properties as synthetic lubricating oils. The polyesters of this invention, in addition to possessing low pour points and flat viscosity-temperature properties which are even better than those of the diesters mentioned above, are readily prepared over a wide viscosity range. It is because of the possibility of preparing the polyester lubricating oils of this invention over a wide viscosity range, that they are aptly described as "tailor-made" synthetic lubricants.

In accordance with my invention, polyester synthetic lubricants are prepared by reacting a glycol, a dibasic acid and a mono-functional compound which may be either a mono-hydroxy alcohol or a mono-carboxylic acid. By reacting a glycol, a dibasic acid and a mono-functional compound, it is possible to prepare polyesters whose properties can be modified by changing the identity of the glycol, dibasic acid and mono-functional reactants and by varying the molecular ratios of the reactants. In this manner, it is possible to prepare a series of synthetic lubricants of varying viscosity. Thus, it is possible to provide synthetic lubricants which are "tailor-made" to meet the optimum specifications prescribed for a particular lubrication job.

The reaction between glycols and dibasic acids ordinarily proceeds until extremely viscous or solid resinous materials are formed because of the continuing nature of the reaction which can proceed indefinitely, forming increasingly larger molecules as long as carboxylic groups and hydroxyl groups are present. In this invention, the polyesterification process is terminated by employing a mono-functional compound so as to produce polyesters whose properties make them excellent lubricants. The molar quantity of mono-functional compound present in relation to the molar quantities of dibasic acid and glycol in the reaction mixture determines the extent of polymerization which occurs and the nature and molecular weight of the resulting product.

The dibasic acid employed in the polyesterification is advantageously aliphatic in nature. Thus malonic, succinic, adipic, azelaic and sebacic acids are examples of dibasic acids which may be used in the process of this invention. It is advisable that the dibasic acid contain four or more carbon atoms in order that the number of ester groups in relation to the carbon content of the polyester molecule be relatively small. Consequently, the dibasic acids which find the most use in the process of this invention are those containing 6 to about 20 carbon atoms such as adipic, azelaic, and sebacic. Polyglycol dipropionic acids prepared by the hydrolysis of the dinitriles obtained by the cyanoethylation of polyethylene glycols may also be used as the dibasic acids of this invention.

In addition to the common glycols such as ethylene glycol, propylene glycol and butylene glycol, ether glycols such as polyethylene and polypropylene glycols, thioether glycols, such as thiodiglycol and thiodipropylene glycol, aminoglycols, such as diethanolamine and mixtures of glycols such as propylene and ethylene glycols may be employed in the process of this invention. It is advantageous if the glycol also contains at least four carbon atoms; in general, glycols containing between 2 and about 20 carbon atoms may be employed.

Advantageously the mono-functional compound used as the esterification-terminating agent should contain at least 4 carbon atoms in order to produce polyesters which have good lubricating properties. 2-ethylbutanol, 2-ethylhexanol are examples of preferred alcohols which may be used to terminate the esterification reaction. 2-ethylbutyric and 2-ethylhexanoic acid are examples of preferred mono-carboxylic acids employed as esterification-terminating reagents. Mixtures of alcohols and mixtures of mono-carboxylic acids may also be used as esterification-terminating reagents. It is to be understood, however, that mono-hydroxy alcohols and mono-carboxylic acids containing between 1 and about 20 carbon atoms per molecule can be employed.

The polyester lubricants of this invention can be prepared by two procedures. One consists of a one-step procedure wherein a mono-functional compound, a dibasic acid and a glycol in a predetermined molecular ratio are heated together simultaneously. An aromatic solvent and an acid esterification catalyst are employed to facilitate the esterification. The second procedure comprises a two-step process wherein a glycol and a dibasic acid in a prescribed molecular ratio are reacted in the first step; in the second step, the mono-functional compound is added and the esterification continued until complete esterification of the terminal groups of the polyester has occurred.

As far as can be ascertained, there is no substantial difference in the properties of polyesters prepared by the different procedures as long as the same molecular ratios of reactants are employed. From a theoretical point of view, the two-step procedure appears preferable in order to minimize the formation of a simple diester such as di-2-ethylhexyl sebacate. The polyesters produced by reaction of the same molecular quantities of glycol, dibasic acid and mono-functional compound appear to have the same properties regardless of whether the polyesterification is effected by a one-step or a two-step procedure. The reactions occurring during esterification in both procedures probably include ester interchange and alkyl interchange in addition to simple esterification so that the composition of the product polyester tends to approach the same equilibrium regardless of the preparative procedure.

In the two-step process, dibasic acid and a glycol in a predetermined ratio, about which more will be said later, are reacted to form a polyester. The polyester is formed by heating the dibasic acid and glycol reactants in a solvent such as toluene with about 0.1 to 1.0 per cent of a non-volatile acid such as p-toluene sulfonic acid under reflux; a water trap is provided to remove the water formed during esterification. When the theoretical amount of water formed by the reaction of the dibasic acid and glycol has been separated, an amount of mono-functional compound, either alcohol or mono-carboxylic acid, equivalent to or in slight excess of that needed to esterify all residual active groups is added to the reaction mixture which is then further heated under reflux until the new theoretical amount of water has been evolved. The reaction mixture is then cooled, washed with water and usually with dilute caustic such as one per cent sodium hydroxide solution in order to remove the acid catalyst and any unreacted acidic groups. The solvent and any excess mono-functional compound are removed by vacuum stripping to produce a polyester which may be used without further treatment as a synthetic lubricant.

If the one-step process is employed, the glycol, dibasic acid and mono-functional compound in a predetermined ratio are dissolved in the solvent such as toluene and are then heated under reflux in the presence of an esterification catalyst until the theoretical amount of water has been evolved. Thereafter, the product mixture is treated exactly the same as if a two-step process had been employed.

Polyesters formed by the reaction between a dibasic acid, a glycol and a mono-functional acid or alcohol have about twice the molecular weight of a mineral oil of corresponding viscosity. The higher molecular weight of the synthetic polyester lubricant imparts desirable characteristics such as a high flash point and low evaporation rate. The high flash point, which is ordinarily well over 1400° F., imparts desirable safety characteristics to the polyester lubricants of this invention.

The combining mol ratio of dibasic acid to glycol when the esterification-terminating agent is an alcohol should fall between 1.10 and 2.00 and preferably between 1.25 and 2.00. When the mol ratio of dibasic acid to glycol is 2.0 and an alcohol is employed as the mono-functional compound, the lightest possible oil is obtained for the particular ingredients. When the mol ratio of dibasic acid to glycol is about 1.25 and an alcohol is used as the esterification-terminating reagent, a very heavy viscous oil is obtained. Since the chain length of the polyester in theory approaches infinity as the mol ratio of dibasic acid to glycol approaches one, the mol ratio of dibasic acid to glycol must be maintained above 1.10 and preferably above about 1.25 and higher when an alcohol is employed as a mono-functional esterification-terminating reagent. Very viscous oils which result when the mol ratio of dibasic acid to glycol is in the range of 1.1 to 1.25 can be used as airplane oils.

Conversely, when a mono-carboxylic acid is employed as the esterification-terminating reagent, the mol ratio of glycol to dibasic acid must be maintained between 1.10 and 2.00 and preferably between 1.25 and 2.00. Employing a mono-carboxylic acid as the mono-functional compound, a light oil is obtained when the mol ratio of glycol to dibasic acid is 2; when the mol ratio of glycol to dibasic acid is about 1.25, a heavy viscous oil is obtained.

Polyesters formed by the interaction of adipic acid, diethylene glycol and 2-ethylhexanol have very satisfactory properties as lubricating oils. Moreover, the starting materials, namely adipic acid, diethylene glycol and 2-ethylhexanol are chemicals which are available at reasonable prices. The polyesters formed by the interaction of adipic acid, diethylene glycol and 2-ethylhexanol have excellent viscosity-temperature properties as indicated by V. I.'s of 130 and up, a low pour and high flash point. In Example I, there will be presented in detail the procedure employed for the preparation of polyesters of adipic acid, diethylene glycol and 2-ethylhexanol.

EXAMPLE I 292 grams of adipic acid, 102 grams of diethylene glycol and 200 cc. of toluene were mixed and heated under reflux in the presence of 7 grams of p-toluene sulfonic acid. The reflux condenser was fitted with a water trap whereby the water split out during the esterification could be removed and measured. When the theoretical amount of water had been separated from the reaction mixture, 286 grams of 2-ethylhexanol were added to the reaction mixture and the heating continued until the theoretical amount of water had been split out. The constituents of the polyester were in the following molecular ratio: 2 mols of adipic acid, 1 mol of diethylene glycol and 2.1 mols of 2-ethylhexanol; the slight molar excess of 2-ethylhexanol is added in order to facilitate the esterification of the last remaining carboxyl groups. After the esterification with 2-ethylhexanol, the reaction mixture was cooled, washed with water and then with 1 per cent sodium hydroxide, Thereafter toluene and excess 2-ethylhexanol were removed under vacuum. After removal of the solvent and excess 2-ethylhexanol, a clear yellow to amber liquid was obtained having the properties listed for compound I of Table I.

A number of other synthetic lubricating oils was prepared from adipic acid, diethylene glycol and 2-ethylhexanol in which the molecular ratio of dibasic acid to glycol varied between 2.00 and 1.25 and their properties are summarized in Table I. The procedure followed for the preparation of these polyester synthetic lubricating agents was the two-step process which has been described in Example I.

TABLE I

*Properties of polyester lubricating oils prepared from adipic acid, diethylene glycol and 2-ethylhexanol*

| | Acid/glycol Mol Ratio | Percent Excess of Alcohol | Mol. Wt. Aver. Calc. | Kin. Visc., 100° F. | Kin. Visc., 210° F. | V. I. | Pour, °F. | Flash, °F. |
|---|---|---|---|---|---|---|---|---|
| I | 2.00 | 10 | 582 | 32.19 | 6.44 | 150 | −70 | 425 |
| II | 1.57 | 10 | 742 | 56.27 | 9.84 | 143 | −50 | 410 |
| III | 1.50 | 10 | 794 | 86.10 | 13.27 | 138 | −45 | 445 |
| IV | 1.25 | 10 | 1,205 | 207.21 | 26.09 | 132 | −40 | 445 |

It will be noted that the kinematic viscosity at 100° F. varies from 25.60 for No. I to 207.21 for No. IV. All of the above polyester lubricating oils have low pour points and high flash points.

Another interesting series of polyester lubricating oils was prepared from sebacic acid, diethylene glycol and 2-ethylhexanol. The preparation of a sebacic acid polyester by the one-step process is outlined in Example II.

EXAMPLE II 404 grams of sebacic acid, 106 grams of diethylene glycol, 260 grams of 2-ethylhexanol, 200 cc. of toluene and 2–3 grams of benzene m-disulfonic acid were heated together under reflux with a water trap until 72 cc. of water were evolved. The reaction product mixture was then washed with sodium bicarbonate solution and water and the solvent was removed by vacuum stripping. The remaining polyester product had the properties given for compound VIII in Table II.

The reproducibility of the properties of polyesters prepared by a one-step or a two-step process employing the same molecular ratio of ingredients is illustrated in Table II. Therein the properties of 4 polyesters prepared from sebacic acid, diethylene glycol, 2-ethylhexanol are itemized; the molecular ratio of reactants was maintained constant in these series of compounds but the compounds V, VI and VII were prepared by a two-step procedure whereas VIII was prepared by a one-step procedure.

TABLE II

*Properties of synthetic lubricating oils prepared from sebacic acid, diethylene glycol and 2-ethylhexanol*

| | Acid/glycol Mol Ratio | Percent Excess of Alcohol | Mol. Wt. | Kin. Visc., 100° F. | Kin. Visc., 210° F. | V. I. | Pour, °F. | Flash, °F. |
|---|---|---|---|---|---|---|---|---|
| V | 2.00 | 50 | 694 | 55.97 | 10.39 | 148 | −40 | 475 |
| VI | 2.00 | 10 | 694 | 66.47 | 11.87 | 146 | −30 | 455 |
| VII | 2.00 | 5 | 694 | 54.52 | 10.22 | 149 | −25 | 470 |
| VIII | 2.00 | 0 | 694 | 54.17 | 10.28 | 150 | −30 | 510 |

The excellent reproducibility of the properties of the polyesters prepared from sebacic acid, diethylene glycol and 2-ethylhexanol illustrated in Table II establishes that the polyester lubricating oils of this invention are capable of commercial development. The reproducibility is particularly noteworthy in view of the fact that two different methods of preparation, namely a one-step and a two-step process, were used in the preparation of the polyesters whose properties are outlined in Table II.

The extraordinary manner in which a series of lubricating oils having modified properties can be prepared by changing the molecular ratio of the ingredients of the polyester is further illustrated in Table III, wherein there are itemized the properties of a series of polyesters prepared from sebacic acid, dipropylene glycol and 2-ethylhexanol in which the molecular ratio of dibasic acid to glycol varies from 2.00 to 1.33.

TABLE III

*Polyester lubricating oils prepared from sebacic acid, dipropylene glycol and 2-ethylhexanol*

| | Acid/glycol Mol Ratio | Percent Excess of Alcohol | Mol. Wt. | Kin. Visc., 100° F. | Kin. Visc., 210° F. | V. I. | Pour, °F. | Flash, °F. |
|---|---|---|---|---|---|---|---|---|
| IX | 2.00 | 0 | 726 | 52.62 | 9.71 | 147 | <−65 | 480 |
| X | 1.45 | 10 | 1,102 | 127.14 | 18.45 | 137 | −55 | 480 |
| XI | 1.45 | 10 | 1,102 | 145.61 | 20.92 | 137 | −55 | 505 |
| XII | 1.33 | 4 | 1,326 | 211.64 | 27.57 | 134 | −45 | 485 |

By comparing compound V in Table II with compound IX in Table III, the variation in the properties of the polyesters by changing the glycol constituent can be observed. The effect of employing a different dibasic acid while maintaining other ingredients and conditions constant can be observed by comparing compound I in Table I and compound V in Table II.

In Example III, the preparation of azelaic acid polyester lubricating oils by a two-step process is illustrated.

carboxylic acids rather than alcohols are used as esterification-terminating agents. In compound XVI, adipic acid, propylene glycol and 2-ethyl butyric acid were reacted to give a polyester lubricating oil; in compound XVII, sebacic acid, diethylene glycol and 2-ethyl hexanoic acid were reacted to give a polyester lubricating oil.

TABLE V

*Properties of polyester lubricants prepared from dibasic acids, glycols and mono-carboxylic acids*

|  | Acid/glycol Mol Ratio | Percent Excess of Mono-carboxylic Acid | Mol. Wt. | K. V., 100° F. | K. V., 210° F. | V. I. | Pour, °F. | Flash, °F. |
|---|---|---|---|---|---|---|---|---|
| XVI | 1.40 | 0 | 732 | 234.9 | 20.98 | 110 | −25 | 505 |
| XVII | 2 | 10 | 658 | 38.90 | 7.14 | 143 | −55 | 375 |

EXAMPLE III 414 grams of azelaic acid, 122 grams of diethylene glycol, 3 grams of m-benzene disulfonic acid and 200 cc. of toluene were heated together under reflux with a water trap until 43 cc. of water were evolved. 260 grams of 2-ethylhexanol were then added and reflux was continued until the total evolved water was 78 cc., when 20 grams more of 2-ethylhexanol were added and reflux continued until no further water was evolved. The product was filtered and stripped under vacuum to remove solvent and excess alcohol. The remaining polyester had the properties of compound XIII of Table IV.

In Table IV, the properties of two azelaic acid polyesters are summarized; 2-ethylhexanol was used as the mono-functional esterification-terminating agent in both examples.

The excellent pour and viscosity-temperature properties of the polyester synthetic lubricating oils prepared in accordance with the method of this invention are evident in all of the above tables. Moreover, the flash points of the prepared polyesters are consistently high, ranging from 400 to over 500° F. If desired, the flash points of the prepared polyesters can be substantially improved by stripping off the lighter portion or by extracting with normal pentane, which is a selective solvent for the lower molecular weight compounds present in the mixed polyester prepared in accordance with the method of this invention.

The almost infinite possibilities for modifying the properties by changing the constituents and the molecular ratios thereof which have been briefly depicted in Tables I, II, III, IV and V are the basis for applying the appellation "tailor-

TABLE IV

*Synthetic lubricating oils prepared from azelaic acid, glycol and 2-ethylhexanol; diethylene glycol and dipropylene glycol were the compounds employed in XIII and XIV respectively*

|  | Acid/glycol Mol Ratio | Percent Excess of Alcohol | Mol. Wt. | Kin. Visc., 100° F. | Kin. Visc., 210° F. | V. I. | Pour, °F. | Flash, °F. |
|---|---|---|---|---|---|---|---|---|
| XIII | 1.83 | 7 | 717 | 52.46 | 9.82 | 148 | −65 | 465 |
| XIV | 1.83 | 0 | 756 | 44.54 | 8.19 | 146 | <−65 | 490 |

The preparation and properties of an adipic acid polyester, compound XV, in which isopropyl alcohol is used as the esterification-terminating agent, are illustrated in Example IV.

EXAMPLE IV 146 grams of adipic acid, 53 grams of propylene glycol (mol ratio of dibasic acid to glycol being 1.43), 200 cc. of toluene and 3 to 5 grams of m-benzene disulfonic acid were heated together under reflux with a water trap until most of theoretical water was evolved. 45 grams (25 per cent excess) of isopropyl alcohol were added and reflux continued until no further water was evolved. The reaction product mixture was then washed with sodium bicarbonate solution and water, whereafter the solvent was removed by vacuum stripping. The remaining polyester product, compound XV, had an average molecular weight of 658, a V. I. of 120, kinematic viscosities of 182.9 cs. and 19.46 at 100 and 210° F. respectively, a pour point below minus 30° F. and a flash point of 400° F.

In Table V, there are illustrated the properties of polyester lubricating oils in which monomade" to the synthetic lubricating oils of this invention.

It is to be understood that other dibasic acids, such as aromatic dibasic acids, glycols and monofunctional compounds, in addition to those which have been specifically mentioned, may be employed to prepare polyester lubricating oils in accordance with the method of this invention. As long as the mol ratio of difunctional compounds is maintained between 1.1 and 2.0 and preferably between 1.25 and 2.0, polyester lubricating oils of high quality are obtained by the method of this invention.

Obviously many modifications and variations of the invention, as hereinbefore set forth, may be made without departing from the spirit and scope thereof and, therefore, only such limitations should be imposed as are indicated in the appended claims.

I claim:

1. A synthetic lubricant consisting essentially of a polyester formed by the reaction of an aliphatic dibasic acid containing 6 to 20 carbon atoms with a glycol of the group consisting of ethylene glycol, propylene glycol, butylene glycol, diethylene glycol and dipropylene glycol and a monofunctional compound containing 4 to 20 carbon atoms and selected from the group consisting of aliphatic monohydroxy alcohols and aliphatic monocarboxylic acids, the mol ratio of difunctional compounds in the reaction mixture being between 1.25 and 2.0.

2. A synthetic lubricant consisting essentially of a polyester formed by the reaction of an aliphatic dibasic acid containing 6 to 20 carbon atoms with a glycol selected from the group consisting of ethylene glycol, propylene glycol, butylene glycol, diethylene glycol and dipropylene glycol and an aliphatic monohydroxy alcohol containing 4 to 20 carbon atoms, the mol ratio of dibasic acid to glycol compounds in the reaction mixture being between 1.25 and 2.0.

3. A synthetic lubricant consisting essentially of a polyester formed by the reaction of an aliphatic dibasic acid containing 6 to 20 carbon atoms with a glycol selected from the group consisting of ethylene glycol, propylene glycol, butylene glycol, diethylene glycol and dipropylene glycol and an aliphatic monocarboxylic acid containing 4 to 20 carbon atoms, the mol ratio of glycol to dibasic acid being between 1.25 and 2.0.

4. A synthetic lubricant consisting essentially of a polyester formed by the reaction of adipic acid, diethylene glycol and 2-ethylhexanol, the mole ratio of said adipic acid to said diethylene glycol in the reaction mixture being between 1.25 and 2.0.

5. A synthetic lubricant consisting essentially of a polyester formed by the reaction of sebacic acid, dipropylene glycol and 2-ethylhexanol, the mole ratio of sebacic acid to dipropylene glycol in the reaction mixture being between 1.25 and 2.0.

6. A synthetic lubricant consisting essentially of a polyester formed by the reaction of sebacic acid, diethylene glycol and 2-ethylhexanoic acid, the mole ratio of diethylene glycol to sebacic acid in the reaction mixture being between 1.25 and 2.0.

7. A synthetic lubricant consisting essentially of polyester formed by the reaction of sebacic acid, diethylene glycol and 2-ethylhexanol, the mol ratio of said sebacic acid to said diethylene glycol in the reaction mixture being between 1.25 and 2.0.

8. A synthetic lubricant consisting essentially of a polyester formed by the reaction of azelaic acid, diethylene glycol and 2-ethylhexanol, the mol ratio of azelaic acid to diethylene glycol in the reaction mixture being between 1.25 and 2.0.

ROBERT T. SANDERSON.

REFERENCES CITED

The following references are of record in the file of this patent:

UNITED STATES PATENTS

| Number | Name | Date |
|---|---|---|
| 1,733,639 | Van Schaack | Oct. 29, 1929 |
| 1,786,404 | Young | Dec. 23, 1930 |
| 1,909,196 | Lawson | May 16, 1933 |
| 1,921,756 | Kienle | Aug. 8, 1933 |
| 2,035,528 | Brubaker | Mar. 31, 1936 |
| 2,073,031 | Sly | Mar. 9, 1937 |
| 2,075,107 | Frazier | Mar. 30, 1937 |
| 2,106,703 | Cox | Feb. 1, 1938 |
| 2,363,045 | De Groote | Nov. 21, 1944 |
| 2,512,722 | Lanhan | June 27, 1950 |